March 24, 1959          E. UIGA          2,879,474

LOW LEVEL WIDE BAND VOLTAGE MEASUREMENT SYSTEM

Filed Feb. 10, 1955          2 Sheets-Sheet 1

INVENTOR:
Endel Uiga,

BY Pierce, Scheffler & Parker,
ATTORNEYS.

INVENTOR:
Endel Uiga,
BY Pierce, Scheffler & Parker,
ATTORNEYS

United States Patent Office 2,879,474
Patented Mar. 24, 1959

2,879,474

LOW LEVEL WIDE BAND VOLTAGE MEASUREMENT SYSTEM

Endel Uiga, Rockaway, N.J., assignor to Ballantine Laboratories, Inc., Boonton, N.J., a corporation of New Jersey Application February 10, 1955, Serial No. 487,305

1 Claim. (Cl. 324—118)

The present invention relates in general to electrical voltage measurement systems and more particularly to those of the type for effecting broad band voltage measurements for small values of signal voltages in the RF and UHF ranges.

Voltage measuring systems which include diode rectifiers present certain difficulties when small signal voltages (less than 1.0 volt) are measured by the prior art methods.

An object of the present invention is to obviate the difficulties of the prior measuring systems.

A further object is to provide a novel method of extending the range of reliable RF and UHF voltage measurements down to lower voltage levels.

A more specific object is to provide a voltage measuring system including an amplitude modulator, and to utilize a modulation frequency component in the diode rectifier output instead of the conventional method of using the direct current change as an indication of the signal voltage amplitude.

Another object is to provide a voltage measuring system in which the modulation frequency component may be passed through a transducing means having a narrow band-width characteristic in order to eliminate all frequencies other than the modulation frequency prior to obtaining an indication of the signal voltage amplitude as based on the magnitude of the modulation frequency component.

The foregoing as well as other objects and advantages will become more readily apparent from the following detailed description of the preferred embodiments of the invention and the accompanying drawings in which:

Figs. 1 and 2 represent known prior art voltage measurement systems and diode detector characteristics, respectively;

Fig. 3 indicates schematically a generic form of the modulated measurement system of the present invention;

Figure 1:
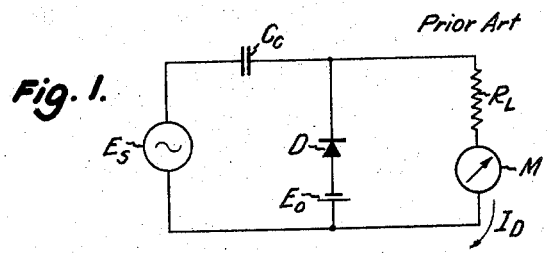

Broad band voltage measurements from audio frequencies into the UHF range have been generally made in known prior art devices by using a diode rectifier D in the circuit as shown in Fig. 1 or some modification thereof in which $E_s$ is the voltage being measured and $I_d$ is the detected direct current which produces an indication of the signal voltage in the meter or indicator M.

Figure 2:
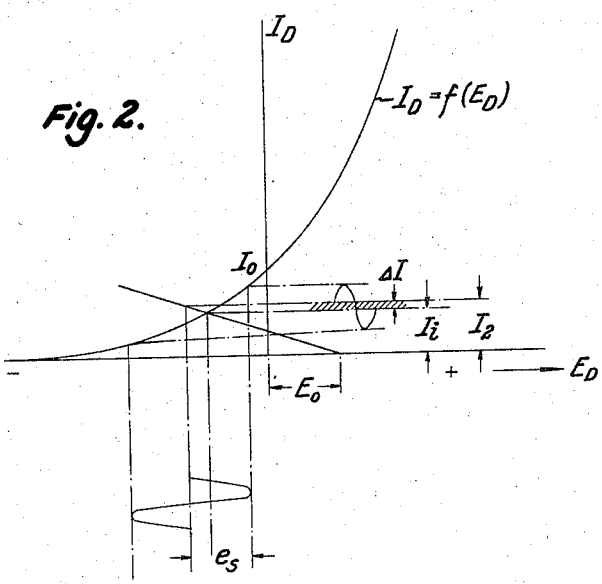

The principle of operation of the circuit can be explained as follows: Referring to Fig. 2 with a load resistance $R_L$ and bias $E_0$ an initial (no signal) direct current $I_1$ will flow through the diode. When an alternating voltage of amplitude $e_s$ is applied through coupling condenser $C_c$ to the diode D an alternating current will flow through the diode in addition to the direct current. Due to the curvature of the diode characteristic $I_d = f(E_d)$ the alternating current will have a direct current $\Delta I$ which changes the value of the initial current $I_1$. The change in direct current $\Delta I$ has a fixed relationship with the signal voltage as determined by the characteristic $I_d = f(E_d)$ of the diode, and therefore $\Delta I$ can be used to measure the input signal voltage.

The change in diode current $\Delta I$ is small and must be determined as a difference between relatively high current values $I_2$ and $I_1$ indicated in Fig. 2. Owing to the inherent properties of the current $I_1$ its value can be kept constant only within certain irreducible limits. When a vacuum diode is utilized as the rectifier D these limits are set by the stabilization of the cathode temperature and hence the initial velocities of the electrons emitted from the cathode. In the case of a crystal diode the limits are set by the thermal potential generated due to the ambient temperature changes, and by the changes in diode current due to the mechanical shock and overload, etc. By using elements and elaborate equipment a reliable measurement of the lowest signal voltage in the order of 10–100 millivolts may be achieved.

The method of operation may be explained as follows:

The diode characteristic can be written as the following power series:

$$I_d = I_0 + a(E_0 - E_s) + b(E_0 - E_s)^2 + c(E_0 - E_s)^3 + \ldots \quad (1)$$

$I_d$ = current through the diode
$E_0$ = bias voltage
$E_s$ = signal voltage applied to the diode
$I_0$ = diode current with $E_0 = E_s = 0$
$a, b, c$ = constants Over a small signal voltage range sufficient approximation can be achieved when only linear and quadratic terms of the series are used.

$$I_d = I_0 + a(E_0 - E_s) + b(E_0 - E_s)^2 \quad (2)$$

When a sinusoidal signal voltage $E_s$ with an amplitude $e_s$ and frequency $f_s$ is applied to the diode $$E_s = e_s \cos st \quad (3)$$

the diode current is $$I_d = I_0 + aE_0 + bE_0^2 t (=I_i, \text{ initial D.C. current}) \quad (4A)$$

$$-(a+2b) \cos st (=\text{fundamental of signal frequency}) \quad (4B)$$

$$+b/2 e_s^2 \cos 2st \ (=\text{second harmonic of signal frequency}) \quad (4C)$$

$$+b/2 e_s^2 (=\Delta I, \text{ change in D.C. current}) \quad (4D)$$

As shown above, when the change of D.C. current $\Delta I$ is used for measuring the signal amplitude a square law relationship can be expected which depends neither on the signal frequency nor on the operating point on the diode characteristic.

The only important factor is the constant $b$ of diode characteristic which can be written as $$b = \frac{\frac{1}{2}d^2 I_d}{dE_s^2} \quad (5)$$

and characterizes the curvature of the characteristic.

When an amplitude modulated signal with a modulation frequency $f_n$ is fed to the diode as:

$$E_s = e_s(1 + m \cos nt) \cos st \quad (6)$$

$m$ = depth of modulation, the following rectification in the diode a spectrum of modulation products of different frequencies in various combinations of $f_n$ and $f_s$ can be detected in the diode current. The lowest frequency components has the frequency of the modulating source $f_n$ and an amplitude $$I_n = be_s^2 m \cos nt \quad (7)$$

As seen from Formula 7 the modulation frequency component depends only on the coefficient $b$ of the diode characteristics and does not depend at all on the signal frequency or on the operating point of the diode characteristic.

When the depth of modulation $m$ is kept constant $I_n$ can be used to indicate the signal amplitude over a wide frequency range.

When $m = 100\%$ the $$I_n = be_s^2 \cos nt \quad (8)$$

The Formulas 4C and 8 are quite similar.

Figure 3:
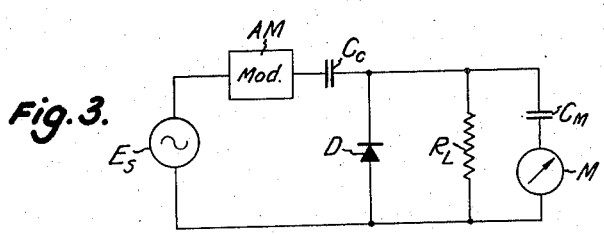

As shown in Fig. 3 of the drawings, a voltage measuring system in accordance with the invention comprises an amplitude modulator AM which amplitude modulates the signal input voltage $E_s$ at a frequency $f_n$ with a constant depth of modulation. Detector D is an alternating current detector coupled to the modulator through coupling condenser $C_c$. Detector D is preferably designed to be frequency selective to the modulation frequency $f_n$. The modulator element amplitude modulates all input signal frequencies by a constant depth of modulation, preferably 100% to achieve maximum detection sensitivity. The indicator M is shunted across the detector through a blocking capacitor $C_m$ and is a selective or synchronous indicator sensitive only to the alternating current of the modulation frequency $f_n$.

Indicator M may optionally take the form of a tuned amplifier or a phase-sensitive detector. It will be obvious to those skilled in the art that the priciple described above may be applied with several modifications to the detector circuit, such as a series diode connection rather than the indicated shunt diode connection, for example.

Various known modulation schemes may be utilized to provide a modulator which will provide the requisite constant depth of modulation over a wide frequency range. Although modulators which are entirely electrical in operation may be used, mechanical modulators such as choppers or vibrators are preferable as they provide a more economical means of modulation which is more stable and less subject to the production of spurious output currents.

Figure 4:
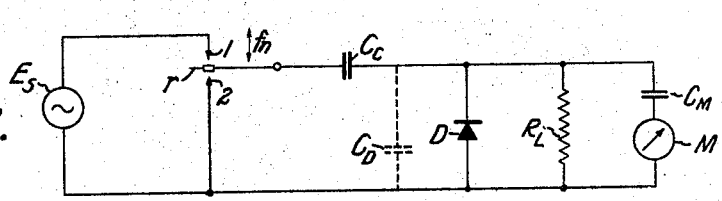
Fig. 4 is a more detailed schematic diagram of the system of Fig. 3.

A preferred detailed modulation scheme is indicated schematically in Fig. 4. A reed $r$ vibrating with a frequency $f_n$ connects the diode D periodically to contacts 1 or 2 so that during one half-cycle of the period the signal $E_s$ is applied to the diode and during the other half-cycle of the period no signal is applied to the diode. In this way 100% modulation of the signal input voltage is achieved. The disadvantage of the circuit shown in Fig. 4 is that the input impedance of the measuring device will not be constant since during the time reed $r$ is connected to contact 1, the diode capacitance $C_d$ is connected to the input. During the other half-cycle period no load is connected to the input.

Figure 5:
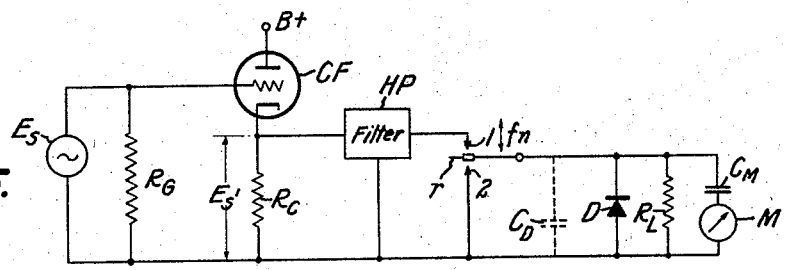
Fig. 5 is a modification of the modulation system of the instant invention.

To overcome this difficulty a circuit employing a second type of modulation system as shown in Fig. 5 may be utilized.

A cathode follower CF may be used in front of the modulator to isolate it from the input circuit $E_s$. The signal $E_s'$ will appear on the load resistance $R_c$ of the cathode follower. The amplitude of $E_s'$ is proportional to the signal amplitude $E_s$ in the input. The output impedance of the cathode follower may be made sufficiently low so that the changing load due to the vibrating modulator contact will have a negligible effect. To prevent the direct current potential of the cathode passing on to the diode a high pass filter HP or blocking capacitor will be necessary between the cathode load $R_c$ and the diode D.

Figure 6:
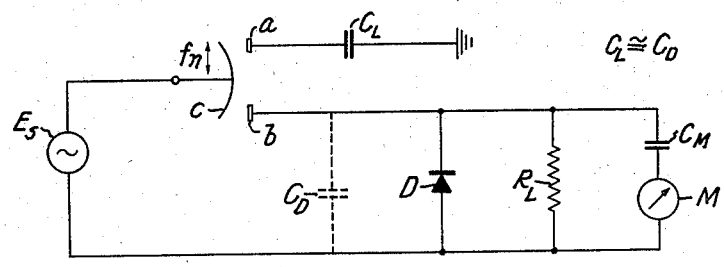
Fig. 6 is a further modification of the modulation system.

As a third type of modulating scheme a differential condenser may be used to achieve a constant input impedance as shown in Fig. 6 to avoid the disadvantage of a limited frequency response such as is encountered with cathode-follower circuits. The differential condenser as shown has two sets of stator plates $a$ and $b$. The plate $a$ is connected to a dummy load capacitance $C_L$ which is similar in value and losses to the loading of the diode D. The movable condenser plate $c$ is alternately coupled to stator $a$ or $b$ by means of a vertical vibration or rotary displacement at the modulation frequency $f_n$. In this manner the capacity $C_{cb}$ between plates $c$ and $b$ varies between a maximum and minimum value and amplitude modulates the signal transmitted to the diode.

The plates of the differential condenser necessarily must be shaped in such a manner that the input capacity, as seen by $E_s$, which is composed of:

$C_{cb}$ in series with $C_d$ plus $C_{ca}$ in series with $C_L$, is constant for every position of the moving condenser plate $c$.

The drawback of such a system is in the fact that it is impossible to achieve 100% modulation which is necessary to realize maximum detection sensitivity since the capacity $C_{cb}$ can vary only between a maximum and minimum value and never reach zero. Thus a small signal voltage is always coupled to the diode D, and full modulation cannot be realized.

Figure 7:
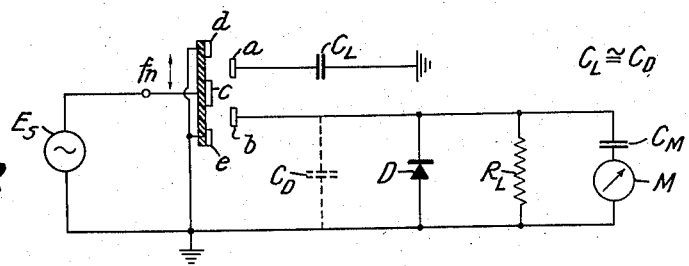
Fig. 7 represents a preferred embodiment in which the depth of the modulation may be increased.

A preferred embodiment which increases the depth of modulation is possible using a differential condenser as shown in Fig. 7. The stator of the condenser has plates $a$ and $b$ as in Fig. 6. The moving element of the condenser has three plates mounted on an insulated support. Plate $c$ is connected to the signal source and plates $d$ and $e$ are connected to ground. The variable coupling between the plates $c$ and $a$ and between $c$ and $b$ occurs in the manner described in connection with Fig. 6. However, when plate $c$ moves across the plate $a$, the signal coupling to the diode is decreased due to the fact that at the same time plate $e$ is moved across the plate $b$ and the capacity $C_{eb}$ between plates $e$ and $b$ provides a shunt to ground of the signal thereby decreasing the direct coupling to the diode from the input source $E_s$.

The measurement system of the proposed invention effects several advantages over conventional prior art systems in that:

(A) The indication of the signal voltage amplitude is independent of the initial (no signal) diode direct current since the modulation frequency may be chosen sufficiently high with respect to the rate of change of the diode's initial current so that the changes in the latter are negligible during a period of modulation. This advantage is particularly important in the case of a vacuum diode where the stabilization of initial tube current requires elaborate equipment to allow a low level measurement to be made.

(B) By eliminating the disturbing effect of the initial current, measurments are possible at lower levels than with conventional systems.

(C) The curvature of the diode characteristic (factor $b$ in Formula 2) is less subject to changes in ambient conditions than are the lower terms of the Formula 2. Hence more stable and accurate measurements can be expected using the method of the present invention.

(D) The low level alternating current detection required with the method of the present invention is comparatively simpler to achieve than an equivalent detector for direct current.

In conclusion, it is to be understood that while the several herein-described embodiments of the present invention represent the preferred methods of practicing the invention, they are but typical of the many variations possible within the scope of the invention as defined in the appended claim.

I claim:

In an audio and radio frequency signal voltage measuring device including in combination input means for applying the signal voltage, a low frequency amplitude modulator coupled to said input means, and rectifying and indicating means connected to said modulator responsive solely to the amplitude of the low frequency modulation components from said modulator; the invention wherein said amplitude modulator comprises a movable assembly cyclically operable at said low frequency and consisting of a pair of grounded plates and a central plate intermediate and equally spaced from said grounded plates, said central plate being connected to said input means, and a stationary assembly consisting of a pair of spaced stator plates substantially parallel to said grounded and central plates, said stator plates being spaced a distance substantially equal to the spacing between said central plate and said grounded plate and arranged so that when said central plate is opposite one of said stator plates, one of said grounded plates will be opposite the other of said stator plates, one of said stator plates being connected to said rectifying and indicator means and the other stator plate being connected to ground through a dummy load having impedances and losses maching those of the load of said rectifying and indicating means.

References Cited in the file of this patent

UNITED STATES PATENTS

| | | |
|---|---|---|
| 2,122,097 | Horsman | June 28, 1938 |
| 2,453,532 | Norton | Nov. 9, 1948 |
| 2,525,039 | Lindenhorius | Oct. 10, 1950 |
| 2,643,280 | Bernier | June 23, 1953 |
| 2,760,127 | Duncan et al. | Aug. 21, 1956 |

FOREIGN PATENTS

| | | |
|---|---|---|
| 333,972 | Great Britain | Aug. 28, 1930 |